United States Patent [19]

Opprecht et al.

[11] 4,160,892
[45] Jul. 10, 1979

[54] METHOD AND APPARATUS FOR SEAM WELDING OVERLAPPED EDGES

[75] Inventors: Paul Opprecht, im hinteren Bernold, Bergdietikon, Switzerland, 8962; Martin Kaul, Bellikon, Switzerland

[73] Assignee: Paul Opprecht, Bergdietikon, Switzerland

[21] Appl. No.: 668,312

[22] Filed: Mar. 18, 1976

[30] Foreign Application Priority Data

Mar. 19, 1975 [CH] Switzerland ............. 3483/75
Jul. 21, 1975 [CH] Switzerland ............. 9488/75

[51] Int. Cl.² ............................... B23K 11/06
[52] U.S. Cl. .......................... 219/83; 219/64; 219/84
[58] Field of Search ............ 219/64, 81, 82, 83, 219/84, 119, 117 R

[56] References Cited

U.S. PATENT DOCUMENTS

| Re. 26,658 | 9/1969 | McCoy | 219/64 |
|---|---|---|---|
| 1,300,603 | 4/1919 | Gravell | 219/83 X |
| 3,495,065 | 2/1970 | Tappolet et al. | 219/64 |
| 3,610,862 | 10/1971 | Erlawdson | 219/64 |
| 3,632,949 | 1/1972 | Thorne | 219/64 |
| 3,716,906 | 2/1973 | Troughton | 219/105 X |
| 3,834,010 | 9/1974 | Wolfe et al. | 219/64 X |

FOREIGN PATENT DOCUMENTS

| 429982 | 8/1967 | Switzerland. |
|---|---|---|
| 519961 | 4/1972 | Switzerland. |
| 910206 | 11/1962 | United Kingdom. |
| 1136980 | 12/1968 | United Kingdom. |
| 1143680 | 2/1969 | United Kingdom. |
| 1180979 | 2/1970 | United Kingdom. |

Primary Examiner—E. A. Goldberg
Attorney, Agent, or Firm—Finnegan, Henderson, Farabow & Garrett

[57] ABSTRACT

Method and apparatus for longitudinally seam welding overlapped edges of metal sheets with continuously renewable flat wire electrodes in which the edges are overlapped a distance of from three to no more than six times the thickness of the edges and the flat wire electrodes have a width from about two to three times the width of the overlap.

18 Claims, 8 Drawing Figures

METHOD AND APPARATUS FOR SEAM WELDING OVERLAPPED EDGES

The present invention relates to a method and apparatus for seam welding overlapped edges of metal sheets and more particularly to a method and apparatus, capable of being operated continuously, for seam-welding the overlapped edges of tinned, galvanized or otherwise surface-treated metal sheets or cold-rolled steel plates with continuous and self-renewing flat, wire electrodes.

Processes for seam welding the overlapped edges of sheets are known by passing the edges between two electrodes, wherein the overlapped range of the sheets' edges to be welded is less than the width of the surface of the welding electrodes. These processes are especially suited for pressure-welding of iron sheets lacking foreign-metal coatings. If, however, coated sheets, for instance tinned or galvanized metal sheets, are welded, such processes are hindered by the coating metal being transferred to the welding electrodes, contaminating the contact areas and thereby requiring continuous maintenance of the electrode surfaces. Further, such processes are ill suited to welding thin sheets of thicknesses of from 0.15 to 0.5 mm, because the sheet or plate edges quickly mar the electrode welding surfaces with gouges or the like, which hinders the passage of the welding currents and gives rise to uneven welds and unsuitable bonds.

Processes are also known in which the edges are overlapped so much that the overlapped range exceeds the width of the electrode welding surfaces. Such processes are suitable for welding coated sheets, but because the overlap range is wider than the welded surface, the outer parts of the sheet edges will not be welded and there is the tendency that these overlapping, non-welded edges will bend away from the welded portion. When such a process is used for example in making cans, they may only be thereafter coated with great difficulty with plastics or lacquer because of the loose edges. Dirt may also collect between the non-welded overlapped edges and if the contents are perishable, they may spoil. It is also known to compress the welded seam region to avoid this problem but this requires an additional step beyond the welding step if the desired results are to be achieved.

Attempts have also been made in the past to obtain overlapped seams by first tacking the sheet along its edges before welding the seam, but the process is costly and furthermore, leads to uneven overlap and inferior welding seams. If tacking is dispensed with, overlaps up to 2 mm (wide) are feasible, but always with the risk of gaping of the welded edges. This prohibits its use in certain industries, and in particular, the food and beverage industry.

In accordance with the present invention, there is provided a method for longitudinally seam welding two overlapping metal sheet edges that substantially avoid these problems, which process comprises feeding two sheet edges of similar thickness and in overlapping relationship to a welding station, said overlap being from about 3 to no more than 6 times the thickness of the edges, continuously feeding a pair of flat wire electrodes to the welding station at the same rate as the overlapped edges and passing the overlapped edges between said pair of electrodes so that they are located on opposite sides of the overlapped seam, said electrodes having a width of from 2 to 3 times that of the overlap, compressing the overlapped edges together between said electrodes at the welding station and simultaneously energizing the electrodes to thereby longitudinally seam weld the overlapped edges whereby the seam extends beyond the overlapped region into adjacent portions of the non-overlapped regions of the sheet edges. Preferably, the sheet edges are passed through a guide means to position them in the proper overlapped position prior to feeding to the welding station and the sheets are held externally during welding to overcome the spreading effect of the compressive electrodes.

The present invention further comprises apparatus for accomplishing the above prescribed method for seam welding two overlapping sheet edges which comprises a welding station having two opposed flat wire electrodes, means for feeding said edges in overlapped relationship to the welding station between said electrodes, means for continuously feeding flat wire electrodes to the station at the same rate as the overlapped edges, said edges being overlapped a distance of from about 3 to no more than 6 times the thickness of the sheet edges and said wire electrodes having a width of from about 2 to 3 times the width of the overlapped region of the sheet edges and means for holding the overlapped edges in position at the welding station so that the electrodes can thereby seam weld the overlapped edges.

Preferably the apparatus includes a guide rail located ahead of the welding station for guiding the edges into proper overlapped position and means to hold the edges in said guide rail during passage therethrough. Further, the flate wire electrode feeding means include a pair of electrode welding rollers each having a notch on their outer surface over which the flat wire electrode is guided, said rollers being mounted on axes parallel to the longitudinal direction of the welding seam, with each axis being offset in opposite directions approximately 0.5° to 1.5° from the longitudinal axis of the welding seam.

It is to be understood that both the foregoing general description and the following detailed description are exemplary and explanatory but are not restrictive of the invention.

The accompanying drawings which are incorporated in and constitute a part of the specification, illustrate an embodiment of the invention and together with the description, serves to explain the principles of the invention. OF THE DRAWINGS.

Reference will now be made in detail to a preferred embodiment of the invention, the example of which is illustrated in the drawings.

For the purpose of clarity and simplification, only those parts of the various mechanisms that are essential to an understanding of the present method and apparatus have been illustrated in the drawings.

The present invention relates to lontitudinal seam welding machines that can be operated continuously and in a semi or fully automatic manner for the longitudinal welding of sheet metal borders or edges as basically described for example in Swiss Pat. Nos. 370,175 and 429,982.

Figure 1:
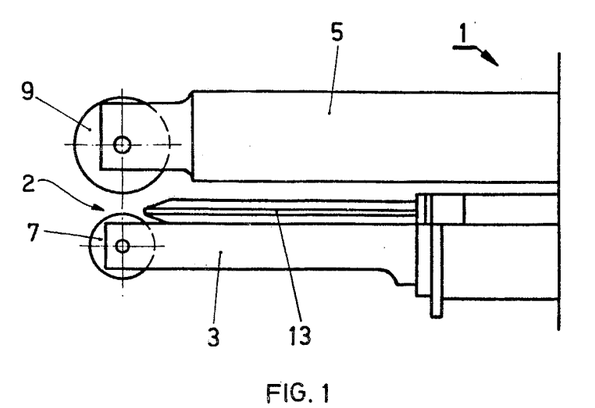
FIG. 1 is a partial side elevational view of a resistance seam welding machine constructed according to the present invention and showing a welding station having upper and lower flat wire, welding electrode rollers and a Z rail for guiding the overlapped sheet edges into the welding rollers.
Figure 2:
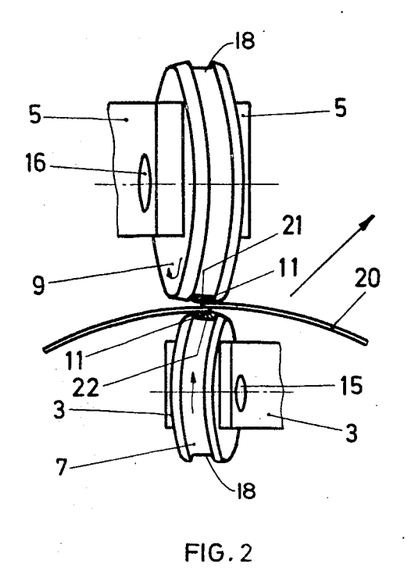
FIG. 2 is an enlarged view looking in the direction of movement of the overlapped sheet edges and flat wire welding electrode rollers.

With reference to FIG. 1 there is shown a part of a longitudinal, resistance welding machine 1 having a welding station 2 that comprises a lower, fixed welding arm 3 and an upper, pivotable welding arm 5. As best shown in FIG. 2, arms 3 and 5 supply flat wire electrodes 11 to welding station 2. In accordance with the invention, means are provided for feeding these electrodes to the station and as embodied, this means comprises a lower welding electrode roller 7 and an upper welding electrode roller 9, each rotatably mounted on axles 15 and 16 which are journaled in corresponding bifurcated ends of the lower and upper welding machine arms 3 and 5, respectively. Welding electrode rollers 7 and 9 each are provided with a groove 18 (see FIG. 2) to seat wire electrode 11 which is guided over these electrode rollers. The wire electrode is approximately of rectangular cross-section and its width to thickness ratio is approximately from about 1 to 2.5 to 1 to 5 and more preferably from about 3.3 to 4.5. The wire electrode can be initially a round wire that is rolled flat by a means, not shown, on the welding machine. As further shown in FIG. 2, wire electrode 11 projects above the contours of rollers 7 and 9, but otherwise is shaped to fit into grooves 18.

Figure 3:
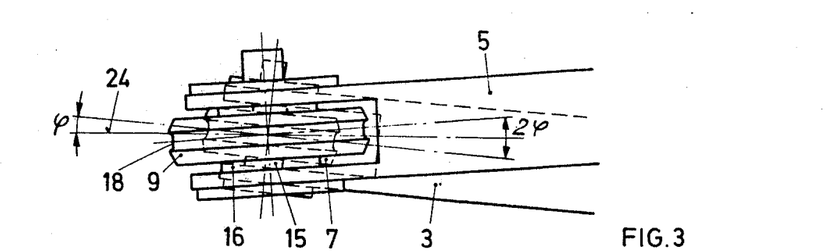
FIG. 3 is a top view of the welding electrode rollers of FIG. 2.

The sheet metal 20 having overlapped edges 21 and 22 to be longitudinally seam welded is shown in FIG. 2 in welding position between the two rollers. The relationship between upper and lower arms 5 and 3 as well as rollers 9 and 7 is also shown in FIG. 3 as will be more fully described below.

Figure 4:
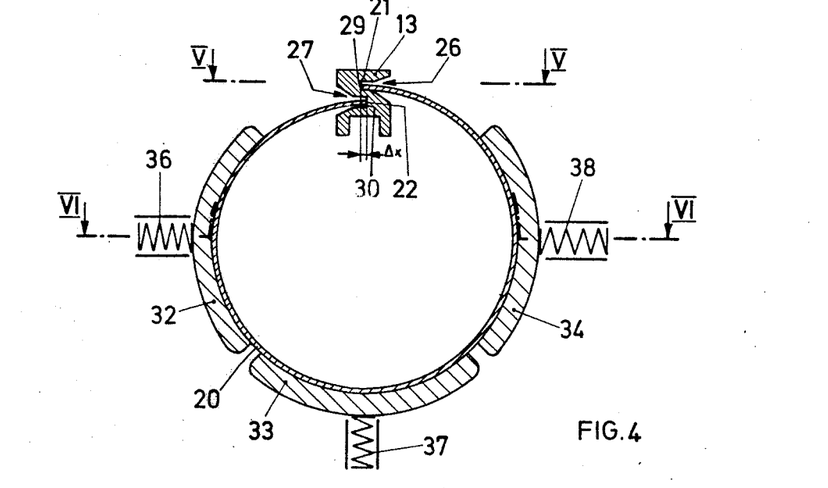
FIG. 4 is a sectional view through the Z rail of FIG. 1 for guiding the overlapped edges of a rolled sheet and schematically illustrating external supporting means.

In accordance with the invention, means are provided for feeding the edges 21, 22 of the metal sheet 20 into welding station 2 of the machine in overlapped relationship. As embodied and as best shown in FIG. 4, this means comprises a Z rail 13 having upper and lower rail grooves 26 and 27 into which are inserted the edges 21, 22 of metal sheet 20. Means are further provided for holding the said edges in the Z rail grooves and for keeping the edges in overlapped position at the welding station.

Figure 6:
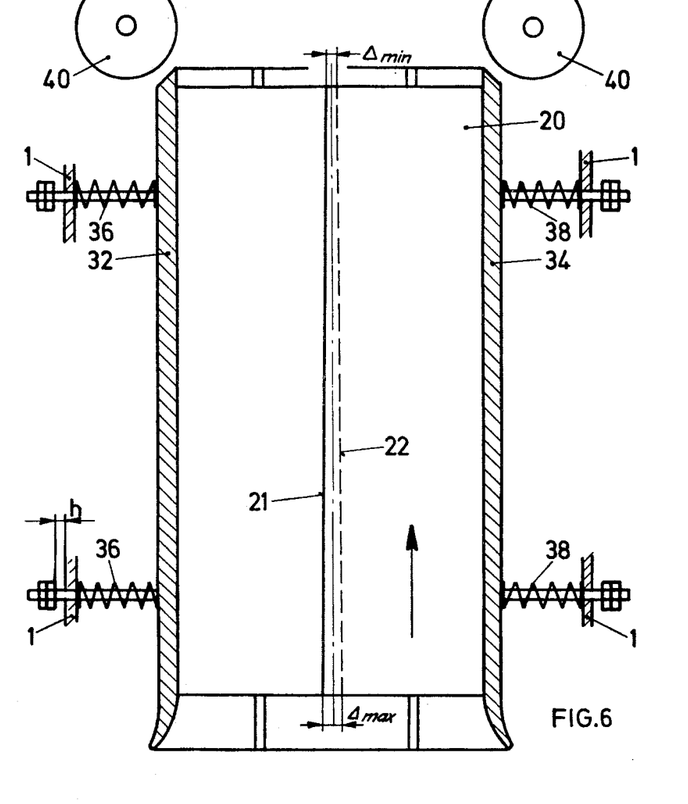
FIG. 6 is a sectional view taken along the line VI—VI of FIG. 4 but showing the overlapped edges of a rolled sheet without the Z rail and additional structure to the external supporting means as well as a centering ring mechanism for holding the overlapped edges in position by the welding station.

In the embodiment shown, the edges 21, 22 are opposite edges of a single rolled sheet or tube 20, such as in the making of cans or the like, and consequently the holding means are arcuate shaped, laterally mounted guidance jaws 32, 33, 34 (see FIGS. 4 and 6) shaped to fit the size of the rolled sheet 20. The jaws are spring loaded, as schematically depicted in FIGS. 4 and 6 by springs 36, 37 and 38 mounted between the jaws 32, 33, 34, respectively, and a part of the frame of welding machine 1. Jaws 32–34 press against the external sides of metal tube 20 pushing edge 21 against the upper groove bottom 29 of rail groove 26 and edge 22 against a lower groove bottom 30 of rail groove 27. Springs 36, 37 and 38 are adjustable and are mounted pairwise as shown in FIG. 6 to compress jaws 32–34 with a force against sheet metal 20 sufficient to achieve accurate guidance of sheet metal edges 21 and 22 and their precise overlap for successful welding. FIG. 6 shows the adjustable displacement "h" for springs 36–38. Lacking those guidance jaws, satisfactory resting of sheet edges 21 and 22 in Z rail 13 cannot be guaranteed. Obviously the pressure from jaws 32–34 may not be excessive or otherwise edges 21 and 22 would be damaged at the Z rail and/or might offer excessive resistance to moving the sheet.

Figure 5:
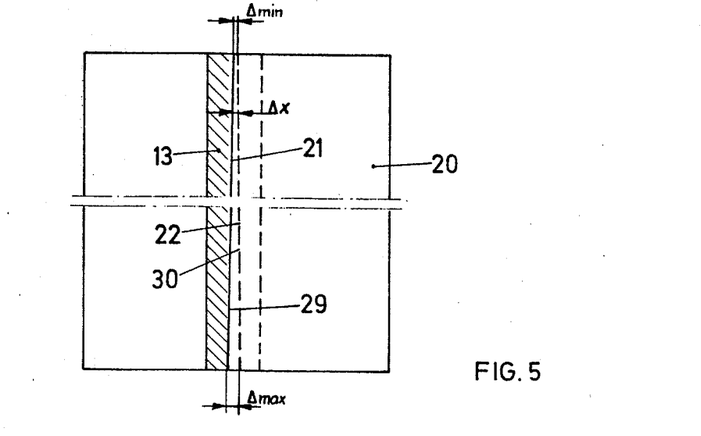
FIG. 5 is a top sectional view taken through the Z rail along the line V—V of FIG. 4 with the external supporting means removed.

As shown in FIGS. 5 and 6, rail grooves 26 and 27 and groove bottoms 29 and 30, respectively, are not parallel to one another but rather are oriented towards each other in the lontidutinal direction of welding. Therefore, the distance between groove bottoms 29 and 30 will be such that the overlap of the sheet metal edges 21 and 22 of sheet metal 20 to be welded will be, for example, at the exit end ($\Delta$min) with respect to the entrance end ($\Delta$max) in the ratio of approximately 1 to 4 to 1 to 8 depending on the length of the sheet. An initial value of 3.5 mm and a final value of 0.8 mm for overlap for a Z rail length of 335 mm is found to be optimum.

The resulting angle subtended by Z rail's 13 supporting surfaces for the sheet metal edges will be approximately from 20' to 60', and more preferably from 25' to 30'. This overlap, that decreases in the direction of welding, allows a more accurate and consistent welded joint along the overlapped seam.

As best shown in FIGS. 2 and 3, welding electrodes 7 and 9 rotate in a plane parallel to and in the longitudinal direction of welding and at an angle to each other. Preferably the angle of rotation is on the order of approximately one degree (0.5° to 1.5°) on each side of the welding direction; the angle being denoted by $\rho$, and the total angle by $2\rho$ in FIG. 3.

This angular arrangement ensures that the two sheet edges 21 and 22 will be pressed against each other during the welding process, so that more evenly overlapped sheet edges 21 and 22 will be obtained, the amount of overlap being for instance 0.8 mm.

In accordance with the invention and during the welding process, flat wire electrode 11 is continuously fed to roller electrodes 7 and 9 at the same rate as the overlapped edges are fed to the welding station, thus providing a continuously self renewing electrode to the sheet 20 as it passes through the welding station.

The rollers also press down on the overlapped portion in a direction normal to the longitudinal direction of welding so that the thickness of the body in the area of the welding seam will not appreciably exceed the sheet thickness (i.e. not more than about 30%). Of course, the sheet thickness will be double for conventional overlapping welding.

In accordance with the invention and to achieve optimum and consistent seam welding, it was found advantageous to overlap the sheet edges 21 and 22 at the welding station from 3 to 6 times the sheet thickness, and to use wire electrodes 11 having a width of from 2 to 3 times the overlap width. For conventional sheet thicknesses in the range of from 0.18 to 0.24 mm, the electrode width will ordinarily be about 2 mm. Minimum width of the electrode wire is desirable on economic grounds, and that of about 2 mm applies to such conditions. Such an electrode wire can be made from a circular wire with a cross-section of 1.5 sq. mm for instance. Obviously, the width of the wire electrode should be larger for greater sheet thicknesses corresponding to larger overlap widths, and accordingly, a thicker round wire would be required as the starting material.

Figure 8:
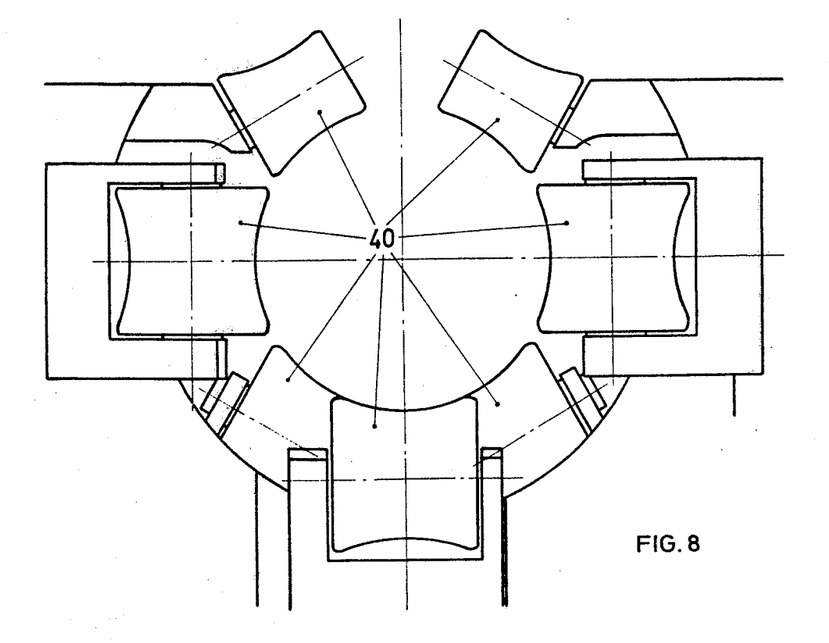
FIG. 8 is an elevational view of the centering ring mechanism of FIG. 6 acting normally to the direction of motion of the sheet at the welding station.

In accordance with the invention, the means for keeping the edges 21, 22 in overlapped position at welding station 2, after they have been accurately aligned by Z rail 13, preferably comprises a centering ring of rotatable, but adjustable, calibrating rollers 40 (see FIG. 8) adjacent the three guidance jaws 32–34 at the welding station 2 as schematically indicated in FIG. 6. If desired, guidance jaws 32–34 may be replaced by a number of closely mounted, spring-biased centering rings such as rollers 40 which would offer less friction to the passage of the sheet.

The welding compression at welding station 2 rises from zero at the first contact between welding rollers 7 and 9 and sheet edges 21, 22 and rises to a maximum of about 60 to 120 kilograms/sq millimeter (KSM) and preferably around 75 KSM. This compares to about 50 KSM for the corresponding case of lap-seam welding. Measured values for instance were found to be in the ratio of 55:75 KSM. Those values were obtained for sheet thicknesses between 0.15 and 0.25 mm. They are correspondingly higher for larger sheet thicknesses where, for example, the overlap of a sheet thickness of 0.4 mm will be approximately 1.2 mm in the area of welding.

During welding the electrodes 11 are energized and the current from the electrode welding surfaces essentially concentrates in the overlapped region which is narrower than the width of the electrode surfaces so that all of the material within the overlapped region will be covered with welding nuggets and their corresponding structure will extend over the entire overlapped region. The edges of the electrode wires will also cover non-overlapping regions of the sheet edges. The current at the edges of the electrode wires will encounter longer paths from one electrode to the other and correspondingly higher resistances so that the current density and hence the heating at said edges is relatively slight, whereby the electrode edges cause a continuous transition of the crystalline transformation away from the overlapped region and will therefore not induce any weakening notches.

In this manner, tearing of the seams is prevented when flanging the welded sheets, and the possibility is now provided—in view of the absence of protruding edges—to coat such sheets without difficulty, for instance with plastics or lacquers. By making use of continuous and self-renewing electrodes, soiling of their surfaces and their wear will not be a problem, the electrode wire itself forming the electrode welding surface and hence renewing same continuously.

By making use of flat wire electrodes in combination with the defined overlap there is achieved in accordance with the present invention and in one operational sequence, a method and apparatus that allows metal sheets, especially thin ones to be seam welded whether they be coated or not and without further preparation, by means of a compressed seam, which is ideally suited to the welding of tin cans flawlessly and in a continuous manner.

Figure 7:
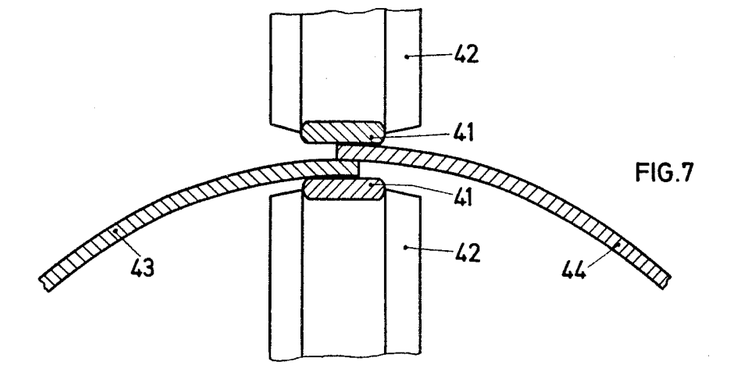
FIG. 7 is an enlarged cross-sectional view through the two flat wire welding electrode rollers of FIG. 2 and showing their relationship to the overlapped edges.

In operation, and with reference to FIG. 7, the two edges of two sheets 43 and 44 that are to be welded are fed between the two tape-like wire electrodes 41 which are guided by and continuously supplied by two corresponding electrode roller carriers 42. Said edges to be welded are made to overlap in the manner and degree as discussed above before entry between the two wire electrodes so that their range of overlap is narrower than the width of electrodes. The rollers rotate with the passage of the overlapped edges, thus continuously supplying fresh electrodes to the welding surface while simultaneously compressing the weld as current is supplied to the electrodes to achieve the desired welded seam.

Preferably, the range of overlap will be so positioned as to be in the center of the wire electrodes, the width of the overlap being about one-half that of the wire electrodes. Thus, if a flat wire approximately 2 mm wide is used as an electrode, then the two sheet edges should overlap about 1 mm and be placed between the electrodes so that the latter will project beyond the overlap region on both sides by about ½ mm. This method achieves welding through the entire region of the overlap, preventing gaping of the edges with sharp edges arising at the welding seam. This data applies to sheet thicknesses of from about 0.15 to 0.3 mm.

The present invention represents an extremely significant technical advance because only with the present described process and the corresponding equipment can the manufacturing industry make cans having the seams that are practically the same or very close to butt-weld seams or even to seamless welds. There are no raised free edges which otherwise make the can unsuitable for the food industry because of the danger of contamination.

In practice, it has been found that a machine implementing the method of the invention can make welded sheet metal cans at a sheet rate from 10 to 40 meters per minute depending on the frequency of the welding power.

As shown by microsections taken of the weld seams, such welding process provides a practically homogeneous weld which is close to that of the original sheet in the region of the weld so that even for intensive flanging there will be no crack formation, and this is of particular importance with regard to further processing of such sheets into cans. In this manner are explained the excellent flanging qualities and the possibility of using lesser grades of sheet metal.

Because of the high productivity and the quality of the seam, which has a strength at least equal to that of the sheet metal, achieved by the present techniques, the can blank have subsequent machining properties and the feasibility of covering the seam with lacquers and power coatings is improved thus lending the process for use in the food, beverage and aerosol industries.

Use of the wire process also allows flawless bonding of both black plates and tin plates, without prior preparation and in continuous operation. Tin-free steel sheets may be welded by this method only with a prior brushing operation being required.

The invention in its broader aspects is not limited to the specific details shown and described and departures may be made from such details without departing from the invention and without sacrificing its chief advantages.

We claim:

1. A method for longitudinally seam welding two overlapping metal sheet edges which comprises feeding two sheet edges of similar thickness to a welding station having opposed rollers on opposite sides of said overlapped sheets, guiding said edges along rigid guide means and biasing said edges toward said rigid guide means by resilient means, other than the metal sheet, which engages said sheet to cause said sheet edges to be in accurate overlapping relationship at said welding station, said overlapped being no more than 6 times the thickness of the edges, continuously feeding a pair of flat wire electrodes to the welding station between the rollers at the same rate as the overlapped edges and passing the overlapped edges in a longitudinal direction between said pair of electrodes so that the electrodes are located on opposite sides of the overlapped seam, said electrodes having a width of from 2 to 3 times that of the overlap, compressing the overlapped edges together between said electrodes at the welding station and simultaneously energizing the electrodes to thereby longitudinally seam weld the overlapped edges whereby the edges are welded with a continuously renewable electrode surface and the seam extends beyond the overlapped region into adjacent portions of the non-overlapped regions of the sheet edges, whereby the outer sheet edges are welded to the adjacent sheet to prevent each outer sheet edge from bending away from the adjacent sheet.

2. The process of claim 1, wherein the wire electrodes and overlapped edges are positioned at the welding station so that their midpoints are aligned.

3. The process of claim 1, wherein the overlapped edges are opposite ends of a rolled sheet and the step of biasing said edges includes supporting the rolled sheet externally prior to entry into and during welding at the welding station to guide the edges into and maintain them in the proper overlapped position.

4. The process of claim 3, wherein the overlapped edges are overlapped initially in excess of the desired distance and are permitted to separate thereafter to the desired distance just prior to arrival at the welding station.

5. The process of claim 1, in which the flat wire electrodes are fed to a pair of grooved roller electrodes located at the welding station which rollers rotate at the same rate as the overlapped edges are fed to the welding station to thereby continuously present fresh electrode surfaces to the overlapped edges, said rollers also compressing the seam during welding at the welding station.

6. The process of claim 1, in which the rollers and electrodes guided thereby are offset from about 0.5 to 1.5 degrees in opposite directions from the longitudinal direction of the welded seam.

7. Apparatus for seam welding two overlapping sheet edges which comprises a welding station having opposed rollers, two opposed flat wire electrodes between said rollers, means for feeding and guiding said edges in accurate overlapped relationship and in a longitudinal direction to the welding station between said electrodes, said feeding and guiding means including rigid means adjacent said welding station for engaging said edges, said feeding and guiding means further including means for resiliently biasing said sheet edges toward said rigid means, means for continuously feeding said flat wire electrodes to the station at the same rate as the overlapped edges, said edges being overlapped a distance no more than 6 times the thickness of the sheet edges and said wire electrodes having a width of from about 2 to 3 times the width of the overlapped region of the sheet edges, and means for holding the overlapped edges in position at the welding station so that the electrodes can thereby seam weld the overlapped edges with continuously renewable electrode surfaces, whereby the outer sheet edges are welded to the adjacent sheet to prevent each outer sheet edge from bending away from the adjacent sheet.

8. Apparatus according to claim 7, wherein the overlapped edges are opposite ends of a rolled sheet and wherein the biasing means includes means for supporting the external surfaces of the rolled sheet to place and maintain the edges in the proper overlapped position prior to and at the welding station.

9. Apparatus according to claim 8, which includes a cluster of rollers acting against opposite external sides of the rolled sheet at the rolling station for holding the edges in proper position during welding.

10. Apparatus according to claim 8, wherein the feeding and guiding means includes a plurality of spring-loaded jaws acting against and shaped to fit the external surface of the rolled sheet and including in combination a Z shaped guide rail having opposite faced grooves for receiving the opposite edges of the rolled sheet and for guiding them into proper overlapped position, said jaws holding the edges in said guide rail as they are fed longitudinally to the welding station.

11. Apparatus according to claim 10, wherein the Z rail grooves diverge outwardly from entrance to exit end with respect to the longitudinal direction of movement of the overlapped edges to the desired overlapped distance.

12. Apparatus according to claim 7, wherein the means for feeding the electrodes comprises a pair of grooved rollers mounted for rotation on opposite sides of the seam at the welding station over which the wire electrodes are guided to thereby continuously supply fresh electrode surface to the seam to be welded.

13. Apparatus according to claim 12, wherein the axes of the rollers and the electrodes guided thereby are offset from about 0.5 to 1.5 degrees in opposite directions from the longitudinal direction of the welded seam.

14. A method for longitudinally seam welding two overlapping metal sheet edges which comprises the steps of positioning a pair of elongated metal sheet edges in accurate overlapping relationship by guiding said edges along rigid guide means and biasing said edges toward said rigid guide means by resilient means, other than the metal sheet, which engages said sheet, feeding said overlapped sheet edges through a welding station having opposed rollers on opposite sides of said overlapped sheet edges, feeding a pair of flat wire electrodes having a width greater than the width of overlap of said sheet edges through the welding station between the rollers and on opposite sides of said overlapped sheet edges, compressing the overlapped sheet edges between the electrodes at the weld station and forming a substantially continuous weld seam along both sides of said sheet edges at the overlap therebetween and beyond the overlapped region into adjacent portions of the non-overlapped regions of said sheet edges, whereby the outer sheet edges are welded to the adjacent sheet to prevent each outer sheet edge from bending away from the adjacent sheet.

15. The method as defined in claim 14 wherein said electrodes have a width of from about 2 to about 3 times the width of overlap of said sheet edges.

16. In a method for longitudinally seam-welding two overlapping metal sheet edges which comprises the steps of supplying the two metal sheet edges into opposite grooves of a guiding means, bringing said edges into overlapping relationship in such a way that the edges are oriented toward each other in the longitudinal direction of welding, supporting the external surface of said sheet edges and biasing the edges to be welded toward the opposite grooves of said guiding means by resilient means, other than the metal sheet, which engages said sheet and guides the sheet edges in proper overlapped position, feeding the overlapped sheet edges to a welding station and passing the overlapping edges in a longitudinal direction between a continuously fed pair of flat wire electrodes fed over a pair of roller electrodes located on opposite sides of said sheet edges at said welding station, said wire electrodes having a width greater than the width of overlap of said sheet edges in the welding station, the axes of said roller electrodes being offset from about 0.5 to about 1.5° in opposite directions from the longitudinal direction of the welded seam, compressing the overlapped edges together between said electrodes at the welding station, simultaneously energizing the electrodes to thereby form a longitudinal weld seam along both sides of the overlapped sheet edges and beyond the overlapped region into the adjacent portion of the non-overlapped regions of the sheet edges, whereby the metal edges are welded with a continuously renewable electrode surface, and whereby the outer sheet edges are welded to the adjacent sheet to prevent each outer sheet edge from bending away from the adjacent sheet.

17. Apparatus for seam welding two overlapping sheet edges which comprises a welding station having opposed rollers, two opposed flat wire electrodes between said rollers, means for feeding and guiding said sheet edges in accurate overlapped relationship and in a longitudinal direction to the welding station between said electrodes, said feeding and guiding means including rigid means adjacent said welding station for engaging said edges, said feeding and guiding means further including means for resiliently biasing said sheet edges toward said rigid means, means for feeding said flat wire electrodes to the welding station at the same rate as the overlapping sheet edges, said wire electrodes having a width greater than the width of the overlapped region of the sheet edges, and means for holding the overlapped sheet edges in position at the welding station so that the electrodes seam weld the overlapped sheet edges with a continuous seam along both sides of said overlapped sheet and extending beyond the overlapped region into the adjacent portions of the non-overlapped regions of the sheets, whereby the outer sheet edges are welded to the adjacent sheet to prevent each outer sheet edge from bending away from the adjacent sheet.

18. Apparatus according to claim 17 wherein said wire electrodes have a width of from about 2 to about 3 times the width of the overlapped region of the sheet edges.

* * * * *

REEXAMINATION CERTIFICATE (207th)
United States Patent [19]
Opprecht et al.

[11] B1 4,160,892
[45] Certificate Issued  Jun. 5, 1984

[54] METHOD AND APPARATUS FOR SEAM WELDING OVERLAPPED EDGES

[75] Inventors: Paul Opprecht, im hinteren Bernold, Bergdietikon, Switzerland, 8962; Martin Kaul, Bellikon, Switzerland

[73] Assignee: Paul Opprecht, Bergdietikon, Switzerland

Reexamination Request:
No. 90/000,358, Apr. 11, 1983

Reexamination Certificate for:
Patent No.: 4,160,892
Issued: Jul. 10, 1979
Appl. No.: 668,312
Filed: Mar. 18, 1976

[30] Foreign Application Priority Data

Mar. 19, 1975 [CH] Switzerland ............ 3483/75
Jul. 21, 1975 [CH] Switzerland ............ 9488/75

[51] Int. Cl.³ .................................... B23K 11/06
[52] U.S. Cl. ............................ 219/83; 219/64; 219/84
[58] Field of Search ............... 219/64, 81, 82, 83, 219/84, 119

[56] References Cited

U.S. PATENT DOCUMENTS

| | | | |
|---|---|---|---|
| Re. 26658 | 9/1969 | McCoy | 219/64 |
| 1,300,603 | 4/1919 | Grovell | 219/83 X |
| 3,001,637 | 9/1961 | Socke | |
| 3,495,065 | 2/1970 | Tappolet et al. | 219/64 |
| 3,596,043 | 4/1969 | Sporri | 219/83 |
| 3,610,862 | 10/1971 | Erlandson | 219/64 |
| 3,632,949 | 1/1972 | Thorne | 219/64 |
| 3,716,906 | 2/1973 | Troughton | 219/105 X |
| 3,834,010 | 9/1974 | Wolfe et al. | 219/64 |
| 4,160,892 | 7/1979 | Opprecht et al. | 219/83 |

FOREIGN PATENT DOCUMENTS

| | | |
|---|---|---|
| 281313 | 12/1914 | Fed. Rep. of Germany . |
| 287561 | 9/1915 | Fed. Rep. of Germany . |
| 336885 | 5/1921 | Fed. Rep. of Germany . |
| 358428 | 9/1922 | Fed. Rep. of Germany . |
| 2000261 | 9/1970 | Fed. Rep. of Germany . |
| 374198 | 12/1958 | Japan . |
| 4727844 | 10/1972 | Japan . |
| 429982 | 8/1967 | Switzerland . |
| 519961 | 4/1972 | Switzerland . |
| 553012 | 5/1972 | Switzerland . |
| 263783 | 3/1927 | United Kingdom . |
| 910206 | 11/1962 | United Kingdom . |
| 961747 | 6/1964 | United Kingdom . |
| 1136980 | 12/1968 | United Kingdom . |
| 1143680 | 2/1969 | United Kingdom . |
| 1180979 | 2/1970 | United Kingdom . |

*Primary Examiner*—Roy N. Envall, Jr.

[57] ABSTRACT

Method and apparatus for longitudinally seam welding overlapped edges of metal sheets with continuously renewable flat wire electrodes in which the edges are overlapped a distance of from three to no more than six times the thickness of the edges and the flat wire electrodes have a width from about two to three times the width of the overlap.

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7, 14, 16 and 17 are determined to be patentable as amended:

Claims 2–6, 8–13, 15 and 18, dependent on amended claims, are determined to be patentable.

1. A method for longitudinally seam welding overlapping metal sheet edges which comprises feeding two sheet edges of similar thickness to a welding station having oposed rollers on opposite sides of said overlapped sheets, guiding said edges along rigid guide means and biasing said edges toward said rigid guide means by resilient means, other than the metal sheet, which engages said sheet to cause said sheet edges to be in accurate overlapping relationship at said welding station, said [overlapped] *overlap* being no more than 6 times the thickness of the edges, continuously feeding a pair of flat wire electrodes to the welding station between the rollers at the same rate as the overlapped edges and passing the overlapped edges in a longitudinal direction between said pair of electrodes so that the electrodes are located on opposite sides of the overlapped seam, said electrodes having a width of from 2 to 3 times that of the overlap, compressing the overlapped edges together between said electrodes at the welding station and simultaneously energizing the electrodes to thereby longitudinally *compress*-seam weld the overlapped edges whereby the edges are welded with a continuously renewable electrode surface and the seam extends beyond the overlapped region into adjacent portions of the non-overlapped regions of the sheet edges, whereby the outer sheet edges are welded to the adjacent sheet to prevent each outer sheet edge from bending away from the adjacent sheet.

7. Apparatus for seam welding two overlapping sheet edges which comprises a welding station having opposed rollers, two opposed flat wire electrodes between said rollers, means for feeding and guiding said edges in accurate overlapped relationship in a longitudinal direction to the welding station between said electrodes, said feeding and guiding means including rigid means adjacent said welding station for engaging said edges, said feeding and guiding means further including means for resiliently biasing said sheet edges toward said rigid means, means for continuously feeding said flat wire electrodes to the station at the same rate as the overlapped edges, said edges being overlapped a distance no more than 6 times the thickness of the sheet edges and said wire electrodes having a width of from about 2 to 3 times the width of the overlapped region of the sheet edges, and means for holding the overlapped edges in position at the welding station so that the electrodes can thereby *compress*-seam weld the overlapped edges with continuously renewable electrode surfaces, whereby the outer sheet edges are welded to the adjacent sheet to prevent each outer sheet edge from bending away from the adjacent sheet.

14. A method for longitudinally seam welding two overlapping metal sheet edges which comprises the steps of positioning a pair of elongated metal sheet edges in accurate overlapping relationship by guiding said edges along rigid guide means and biasing said edges toward said rigid guide means by resilient means, other than the metal sheet, which engages said sheet, feeding said overlapped sheet edges through a welding station having opposed rollers on opposite sides of said overlapped sheet edges, feeding a pair of flat wire electrodes having a width greater than the width of overlap of said sheet edges through the welding station between the rollers and on opposite sides of said overlapped sheet edges, compressing the overlapped sheet edges between the electrodes at the weld station and forming a substantially continuous *compress* weld seam along both sides of said sheet edges at the overlap therebetween and beyond the overlapped region into adjacent portions of the non-overlapped regions of said sheet edges, whereby the outer edges are welded to the adjacent sheet to prevent each outer sheet edge from bending away from the adjacent sheet.

16. In a method for longitudinally seam-welding two overlapping metal sheet edges which comprises the steps of supplying the two metal sheet edges into opposite grooves of a guiding means, bringing said edges into overlapping relationship in such a way that the edges are oriented toward each other in the longitudinal direction of welding, supporting the external surface of said sheet edges and biasing the edges to be welded toward the opposite grooves of said guiding means by resilient means, other than the metal sheet, which engages said sheet and guides the sheet edges in proper overlapped position, feeding the overlapped sheet edges to a welding station and passing the overlapping edges in a longitudinal direction between a continuously fed pair of flat wire electrodes fed over a pair of roller electrodes located on opposite sides of said sheet edges at said welding station, said wire electrodes having a width greater than the width of overlap of said sheet edges in the welding station, the axes of said roller electrodes being offset from about 0.5 to about 1.5° in opposite directions from the longitudinal direction of the welded seam, compressing the overlapped edges together between said electrodes at the welding station, simultaneously energizing the electrodes to thereby form a longitudinal *compressed* weld seam along both sides of the overlapped sheet edges and beyond the overlapped region into the adjacent portion of the non-overlapped regions of the sheet edges, whereby the metal edges are welded with a continuously renewable electrode surface, and whereby the outer sheet edges are welded to the adjacent sheet to prevent each outer sheet edge from bending away from the adjacent sheet.

17. Apparatus for seam welding two overlapping sheet edges which comprises a welding station having opposed rollers, two opposed flat wire electrodes between said rollers, means for feeding and guiding said sheet edges in accurate overlapped relationship in a longitudinal direction to the welding station between said electrodes, said feeding and guiding means including rigid means adjacent said welding station for engaging said edges, said feeding and guiding means further including means for resiliently biasing said sheet edges toward said rigid means, means for feeding said flat wire electrodes to the welding station at the same rate as the overlapping sheet edges, said wire electrodes having a width greater than the width of the overlapped region of the sheet edges, and means for holding the overlapped sheet edges in position at the welding station so that the electrodes *compress*-seam weld the overlapped sheet edges with a continuous seam along both sides of said overlapped sheet and extending beyond the overlapped region into the adjacent portions of the non-overlapped regions of the sheets, whereby the outer sheet edges are welded to the adjacent sheet to prevent each outer sheet edge from bending away from the adjacent sheet.

* * * * *

REEXAMINATION CERTIFICATE (880th)
United States Patent [19]
Opprecht et al.

[11] B2 4,160,892
[45] Certificate Issued Jun. 28, 1988

[54] METHOD AND APPARATUS FOR SEAM WELDING OVERLAPPED EDGES

[75] Inventors: Paul Opprecht, Bergdietikon; Martin Kaul, Bellikon, both of Switzerland

[73] Assignee: Elpatronic Ag Zug, Switzerland

Reexamination Request:
No. 90/001,068, Aug. 15, 1986
No. 90/001,188, Mar. 12, 1987

Reexamination Certificate for:
Patent No.: 4,160,892
Issued: Jul. 10, 1979
Appl. No.: 668,312
Filed: Mar. 18, 1976

Reexamination Certificate B1 4,160,892 issued Jun. 5, 1984.

[30] Foreign Application Priority Data
Mar. 19, 1975 [CH] Switzerland ............ 3483/75
Jul. 21, 1975 [CH] Switzerland ............ 9488/75

[51] Int. Cl.$^4$ ............................................. B23K 11/06
[52] U.S. Cl. ...................................... 219/83; 219/64; 219/84
[58] Field of Search ................. 219/64, 81, 82, 83, 219/84, 119

[56] References Cited
U.S. PATENT DOCUMENTS
Re. 26,658 9/1969 McCoy .
3,596,043 4/1969 Sporri .
3,610,862 10/1971 Erlandson .
3,834,011 9/1974 Wolfe .
4,223,196 9/1980 Erlandson et al. .................. 219/61.2

FOREIGN PATENT DOCUMENTS
553012 5/1972 Switzerland .

OTHER PUBLICATIONS

Soudronic AG "Operating Instruction for Automatic Tin Plate Seam-Welding Machine Type: RZda 330/500/25," Jul., 1969, Title, cover and index pages, p. 1.9 and Drawing M-7409.
Soudronic AG "Operating and Service Manual-Fully Automatic Tin Plate Seam Welding Machine Type ABME with Ferguson Gear," Sep., 1974, Title page, specifications, Table of Contents, Notes, pp. 1.1-1.6, 1.15-1.18, 1.22-1.23, 1.27-1.28, I.V.1, I.V.3, I.V.6, I.V.7, I.V.9, I.V.10, 2.1, 3.1-3.3, 3.7, 3.21-3.25, 3.32-3.37, 3.47, 4.1, 5.1, 5.9, 5.13-5.17, 5.V.I., Drawings M-7571, 7692, 10830, 11545, 32450, 44853, 20638-05, 21351E, Photographs 1-10.
McGraw-Hill Book Company, Inc., 1950, Stanley, "Resistance Welding," Title page and p. 225.
"Elliptic Monofil System" brochure of Soudronic AG, Aug., 1971.
T. Lyman, Editor, *Metals Handbook*, vol. 6, Welding and Brazing, 1971, p. 433.

*Primary Examiner*—Clifford C. Shaw

[57] ABSTRACT

Method and apparatus for longitudinally seam welding overlapped edges of metal sheets with continuously renewable flat wire electrodes in which the edges are overlapped a distance of from three to no more than six times the thickness of the edges and the flat wire electrodes have a width from about two to three times the width of the overlap.

… …

B2 4,160,892

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 4 and 11 are cancelled.

Claims 1, 7, 14, 16 and 17 are determined to be patentable as amended.

Claims 2, 5, 6, 8–10, 12, 13, 15 and 18, dependent on an amended claim, are determined to be patentable.

New claims 19–22 are added and determined to be patentable.

1. A method for longitudinally seam welding overlapping metal sheet edges *defined by opposite ends of a rolled sheet* which comprises feeding two *unattached* sheet edges of similar thickness to a welding station having opposed rollers on opposite sides of said overlapped sheets, guiding said edges along rigid guide means and biasing said edges toward said rigid guide means by resilient means, other than the metal sheet, which engages said sheet to cause said sheet edges to be in accurate overlapping relationship at said welding station, *the overlap being initially in excess of the desired overlap and being permitted to separate thereafter to the desired overlap just prior to arrival at the welding station,* said overlap being no more than 6 times the thickness of the edges, *supporting the rolled sheet externally prior to entry into and during welding at the welding station to guide the edges into and maintain them in the proper overlapped position,* continuously feeding a pair of flat wire electrodes to the welding station between the rollers at the same rate as the overlapped edges and passing the overlapped edges in a longitudinal direction between said pair of electrodes so that the electrodes are located on opposite sides of the overlapped seam, said electrodes having a width of from 2 to 3 times that of the overlap, compressing the overlapped edges together between said electrodes at the welding station and simultaneously energizing the electrodes to thereby longitudinally compress-seam weld the overlapped edges whereby the edges are welded with a continuously renewable electrode surface and the seam extends beyond the overlapped region into adjacent portions of the non-overlapped regions of the sheet edges, whereby the outer sheet edges are welded to the adjacent sheet to prevent each outer sheet edge from bending away from the adjacent sheet.

7. Apparatus for seam welding two *unattached* overlapping sheet edges which comprises a welding station having opposed rollers, two opposed flat wire electrodes between said rollers, means for feeding and guiding said edges in accurate overlapped relationship in a longitudinal direction to the welding station between said electrodes, said feeding and guiding means including rigid means adjacent said welding station *having grooves* for engaging said edges, *the grooves overlapping each other and diverging in the direction of movement of the edges to a downstream end of the rigid means so that the edge overlap as defined by the grooves reaches its minimum at the downstream end of the rigid means,* said feeding and guiding means further including means for resiliently biasing said sheet edges toward said rigid means, means for continuously feeding said flat wire electrodes to the station at the same rate as the overlapped edges, said edges being overlapped a distance no more than 6 times the thickness of the sheet edges and said wire electrodes having a width of from about 2 to 3 times the width of the overlapped region of the sheet edges, and means for holding the overlapped edges in position at the welding station so that the electrodes can thereby compress-seam weld the overlapped edges with continuously renewable electrode surfaces, whereby the outer sheet edges are welded to the adjacent sheet to prevent each outer sheet edge from bending away from the adjacent sheet.

14. A method for longitudinally seam welding two *unattached* overlapping metal sheet edges which comprises the steps of positioning a pair of elongated metal sheet edges in accurate overlapping relationship by guiding said edges along rigid guide means [and] *over a course which continuously decreases the edge overlap in the direction of movement of the edges over at least a portion of the length of the rigid guide means to a downstream end thereof,* biasing said edges toward said rigid guide means by resilient means, other than the metal sheet, which engages said sheet, feeding said overlapped sheet edges through a welding station having opposed rollers on opposite sides of said overlapped sheet edges, *holding the edges in their desired overlapped position at the welding station,* feeding a pair of flat wire electrodes having a width greater than the width of overlap of said sheet edges through the welding station between the rollers and on opposite sides of said overlapped sheet edges, compressing the overlapped sheet edges between the electrodes at the weld station and forming a substantially continuous compress weld seam along both sides of said sheet edges at the overlap therebetween and beyond the overlapped region into adjacent portions of the non-overlapped regions of said sheet edges, whereby the outer edges are welded to the adjacent sheet to prevent each outer sheet edge from bending away from the adjacent sheet.

16. In a method for longitudinally seam-welding two *unattached* overlapping metal sheet edges which comprises the steps of supplying the two metal sheet edges into opposite grooves of a guiding means, bringing said edges into overlapping relationship in such a way that the edges are oriented toward each other in the longitudinal direction of welding *and so that the overlap of the edges decreases as the edges move along the grooves to a downstream end thereof,* supporting the external surface of said sheet edges and biasing the edges to be welded toward the opposite grooves of said guiding means by resilient means, other than the metal sheet, which engages said sheet and guides the sheet edges in proper overlapped position, feeding the overlapped sheet edges to a welding station and passing the overlapping edges in a longitudinal direction between a continuously fed pair of flat wire electrodes fed over a pair of roller electrodes located on opposite sides of said sheet edges at said welding station, said wire electrodes having a width greater than the width of overlap of said sheet edges in the welding station, the axes of said roller electrodes being offset from about 0.5° to about 1.5° in opposite directions from the longitudinal direction of the welded seam, *holding the edges in their desired overlapped position at the welding station,* compressing the overlapped edges together between said electrodes at the welding station, simultaneously energizing the electrodes to thereby form a longitudinal compressed weld seam along both sides of the overlapped sheet edges and beyond the overlapped region into the adjacent portion of the nonoverlapped regions of the sheet edges, whereby the metal edges are welded with a continuously renewable electrode surface, and whereby the outer sheet edges are welded to the adjacent sheet to prevent each outer sheet edge from bending away from the adjacent sheet.

17. Apparatus for seam welding two *unattached* overlapping sheet edges which comprises a welding station having opposed rollers, two opposed flat wire electrodes between said rollers, means for feeding and guiding said sheet edges in accurate overlapped relationship in a longitudinal direction to the welding station between said electrodes, said feeding and guiding means including rigid means adjacent said welding station *having overlapping grooves* for engaging said edges, *the grooves being angularly inclined relative to each other from a downstream end of the rigid means in an upstream direction so that the overlap is smallest at the downstream end of rigid means,* said feeding and guiding means further including means for resiliently biasing said sheet edges toward said rigid means, means for feeding said flat wire electrodes to the welding station at the same rate as the overlapping sheet edges, said wire electrodes having a width greater than the width of the overlapped region of the sheet edges, and means for holding the overlapped sheet edges in position at the welding station so that the electrodes compress-seam weld the overlapped sheet edges with a continuous seam along both sides of said overlapped sheet and extending beyond the overlapped region into the adjacent portions of the nonoverlapped regions of the sheets, whereby the outer sheet edges are welded to the adjacent sheet to prevent each outer sheet edge from bending away from the adjacent sheet.

19. A method for longitudinally compression seam welding two unattached metal sheet edges which overlap a predetermined distance at a welding station which comprises the steps of guiding said edges along rigid guide means and biasing said edges toward said rigid guide means by resilient means, *other than the metal sheet, which engages said sheet,* so that the edges initially overlap by more than the predetermined distance and thereafter gradually separate as they are guided along the rigid guide means so that the predetermined distance is reached at about the welding station, feeding said overlapped sheet edges through the welding station having opposed rollers on opposite sides of said overlapped sheet edges, feeding flat wire electrodes having a width greater than the width of overlap of said sheet edges through the welding station between the rollers and on opposite sides of said overlapped sheet edges, holding the edges at the welding station so that the edges overlap by the predetermined distance, compressing the overlapped sheet edges between the electrodes at the welding station and forming a substantially continuous compress weld seam along both sides of said sheet edges at the overlap therebetween and beyond the overlapped region into adjacent portions of the non-overlapped regions of said sheet edges, whereby the outer edges are welded to the adjacent sheet to prevent each outer sheet edge from bending away from the adjacent sheet.

20. Apparatus for compression seam welding two unattached, overlapping sheet edges which comprises a welding station having opposed rollers, opposed flat wire electrodes between said rollers, means for feeding and guiding said sheet edges in accurate overlapped relationship in a longitudinal direction to the welding station between said electrodes, *said feeding and guiding means including elongated rigid means upstream of said welding station for engaging said edges, the rigid means being formed to provide an edge overlap proximate an upstream end of the rigid means which is greater than the edge overlap at a downstream end of the rigid means and which gradually and continually decreases from adjacent the upstream end to the downstream end of the rigid means, said feeding and guiding means further including means for biasing said sheet edges toward said rigid means, means for feeding said flat wire electrodes to the welding station at substantially the same speed as the overlapping sheet edges,* said wire electrodes having a width greater than the width of the overlapped region of the sheet edges, and means for holding the overlapped sheet edges in position at the welding station so that the electrodes compress-seam weld the overlapped sheet edges with a continuous seam along both sides of said overlapped sheet and extending beyond the overlapped region into the adjacent portions of the nonoverlapped regions of the sheets, whereby the outer sheet edges are welded to the adjacent sheet to prevent each outer sheet edge from bending away from the adjacent sheet.

21. A method for compression seam welding two unattached overlapping metal sheet edges of a substantially cylindrical can body comprising the steps of longitudinally feeding the can body to a welding station having rollers on opposite sides of the overlapping edges; providing a rigid, longitudinal Z-rail having a tip spaced from and located upstream of the welding station and longitudinal grooves adapted to receive the overlapping edges, arranging the longitudinal grooves so that the edge overlap gradually and continually decreases from a point spaced upstream of a downstream end of the Z-rail to the downstream end thereof; holding the overlapped edges in their welding position at the welding station so that the overlap is no more than about six times the thickness of the edges; applying a resilient force to the exterior of the can body from about the Z-rail tip towards an upstream end of the body which biases the overlapping edges of the can body into the Z-rail grooves to thereby maintain the edges in an accurately overlapped position at the welding station; continuously feeding a pair of substantially flat wire electrodes to the welding station between the welding rolls and at the same speed as the speed of the overlapped edges; passing the overlapped edges in a longitudinal direction between the pair of wire electrodes so that the electrodes are located on opposite sides of the overlapped edges, the electrodes having a width greater than the edge overlap; and compressing the overlapped edges together between the flat electrodes at the welding station and simultaneously energizing the electrodes to thereby longitudinally mash seam weld the overlapped edges; whereby the edges are welded with a continuously renewable electrode surface, the seam extends beyond the overlapped region into adjacent portions of the nonoverlapped regions of the sheet edges and the seam has a thickness less than the combined thickness of the overlapping edges.

22. Apparatus for compression seam welding two unattached overlapping sheet edges of a substantially cylindri-

*cally can body comprising a welding station defined by a pair of opposite rollers and opposed wire electrodes each supported by one of the rollers; an elongated, rigid guide rail having a tip proximate to and spaced upstream from the welding station and extending from the tip in an upstream direction, the guide rail including longitudinal grooves adapted to receive the can body edges in an overlapping relationship and overlapping groove bottoms adapted to engage the can body edges, the groove bottoms being angularly inclined relative to each other so that their overlap decreases over the length of the guide rail and reaches its minimum at the tip thereof; a calibration ring of rotatable calibrating rolls disposed downstream of the guide rail tip, engaging a periphery of the can body and maintaining a predetermined edge overlap at the welding station; spring biased means spaced from and positioned upstream of the calibrating rolls, and overlying the guide rail for engaging a periphery of the can body and biasing its overlapped edges into the grooves of the guide rail; the calibration ring, the guide rail and the spring biased means cooperating to maintain an edge overlap at the welding station of no more than about six times the thickness of the edges; means for continuously feeding the flat wire electrodes to the welding station at substantially the same speed as the speed with which overlapped edges pass the welding station; the wire electrodes having a width greater than the width of the edge overlap at the welding station.*

* * * * *